(12) United States Patent
Wrobbel

(10) Patent No.: US 6,500,379 B1
(45) Date of Patent: Dec. 31, 2002

(54) METHOD FOR FABRICATING SYNTHETIC-MATERIAL MOLDED PARTS THROUGH BLOW MOLDING

(75) Inventor: Werner Wrobbel, Gütersloh (DE)

(73) Assignee: Moeller Plast GmbH, Bielefeld (DE)

( * ) Notice: Subject to any disclaimer, the term of this patent is extended or adjusted under 35 U.S.C. 154(b) by 0 days.

(21) Appl. No.: 09/379,218

(22) Filed: Aug. 23, 1999

Related U.S. Application Data

(63) Continuation of application No. PCT/DE98/00014, filed on Jan. 7, 1998.

(30) Foreign Application Priority Data

Feb. 21, 1997 (DE) .......................................... 197 06 838

(51) Int. Cl.⁷ .......................... B29C 49/22; B29C 49/54
(52) U.S. Cl. ........................ 264/515; 264/516; 264/531; 264/534
(58) Field of Search ................................ 264/515, 516, 264/531, 534; 425/522, 525, 527

(56) References Cited

U.S. PATENT DOCUMENTS

| | | | |
|---|---|---|---|
| 3,452,125 A | * 6/1969 | Schurman et al. | 264/521 |
| 4,070,430 A | * 1/1978 | Confer | 264/540 |
| 4,123,217 A | * 10/1978 | Fischer et al. | 425/525 |
| 5,194,305 A | * 3/1993 | Shirahata et al. | 428/31 |
| 6,136,259 A | * 10/2000 | Puffenberger et al. | 264/515 |

FOREIGN PATENT DOCUMENTS

| | | |
|---|---|---|
| DE | 195 36 768 A1 | 4/1997 |
| EP | 0 626 248 A1 | 11/1994 |
| EP | 0 738 580 A1 | 10/1996 |
| WO | WO 96/01212 | 1/1996 |

OTHER PUBLICATIONS

Patent Abstracts of Japan No. 02–120024 A (Hirotaka et al.), dated May 8, 1990.
Patent Abstracts of Japan No. 58–090926 A (Yoshiaki), dated May 30, 1983.
Patent Abstracts of Japan No. 04–259532 A (Isao), dated Sep. 16, 1992.

* cited by examiner

*Primary Examiner*—Suzanne E. McDowell
(74) *Attorney, Agent, or Firm*—Laurence A. Greenberg; Werner H. Stemer; Gregory L. Mayback

(57) ABSTRACT

A method for fabricating synthetic-material molded parts through extrusion blow molding, produces sharp-edged, strong contours and/or undercuts in the region of break-throughs. A synthetic-material tube introduced into the blow-molding die is initially widened by pneumatic pressure, shaped and held on smooth or slightly contoured surfaces of the blow-molding die. However, strong, sharp-edged contours are shaped by mechanical pressure exercised on an outer surface of the synthetic-material tube by a shaping tool. A device for carrying out the process has a blow-molding die with a wall in which shaping slides are guided in one or more parts that can be guided in the interior of the blow-molding die and have sliding parts which can be driven independently of each other or in synchronism.

6 Claims, 2 Drawing Sheets

METHOD FOR FABRICATING SYNTHETIC-MATERIAL MOLDED PARTS THROUGH BLOW MOLDING

CROSS-REFERENCE TO RELATED APPLICATION

This application is a continuation of copending International Application No. PCT/DE98/00014, filed Jan. 7, 1998, which designated the United States.

BACKGROUND OF THE INVENTION

FIELD OF THE INVENTION

The invention relates to a method for fabricating synthetic-material molded parts with sharp-edged, strong contours or undercuts, preferably supporting or covering parts for motor vehicles containing recesses and/or break-throughs or passages, through blow molding a freshly extruded synthetic-material tube. The invention also relates to a device for implementing the method.

Synthetic-material molded parts, which may also be coated or partly coated, are needed in the automobile industry, e.g. for dashboards, which are formed with deep recesses or break-throughs with undercuts for accepting or leading through fittings and other functional elements, for example. The realization of those kinds of molded parts as hollow bodies fabricated by the blow molding process makes it possible to achieve high stability combined with flexibility. Despite the advantages of that method, difficulties can arise during the molding of strong, sharp-edged contours or undercuts. That is because during blow molding of a freshly extruded viscous thermoplastic synthetic-material tube, which is inserted into a blow-molding die and pressed against or into internal contours of the blow-molding die through blowing in air, its inner surfaces can touch. That occurs especially in the case of narrow or flat-shaped extruded tubes and contours reaching far into the inside of the die. Therefore, defect-free fabrication of the molded part is no longer guaranteed because of the bonds which result. The danger of unwanted bonds is particularly acute when forming undercuts and in regions with a very small separation between the inner surfaces for subsequent formation of cutouts. If a coating, for example of a textile material, must also be attached to all or to parts of the outer surface of the molded part, it is also possible, especially if the molded part has pronounced contours and undercuts, for the coating material to adhere to the surface of the tube prematurely or for the coating material not to lie properly against the sharp-edged internal contour and be distorted or over-stretched.

In order to avoid the danger of mutual contact between the inner surfaces of the tube and an associated bonding thereof, or a premature contact between the outer surface of the extruded synthetic-material tube and the coating material, a procedure is already known for providing the blow-molding die with drillings connected to a vacuum pump in order to fix the extruded synthetic-material tube or the coating material in a specific position. However, in the case of strongly pronounced contours, that measure is still unable to ensure defect-free fabrication of the molded parts.

SUMMARY OF THE INVENTION

It is accordingly an object of the invention to provide a method and a device for using extrusion blow-molding dies to fabricate synthetic-material molded parts, which overcome the hereinafore-mentioned disadvantages of the heretofore-known methods and devices of this general type, in which the molded parts have strong, sharp-edged contours or cutouts with recesses and possibly with a surface coating and in which high-quality finished products can be produced with a low rejection rate.

With the foregoing and other objects in view there is provided, in accordance with the invention, a method for fabricating synthetic-material molded parts, preferably supporting or covering parts for motor vehicles containing recesses and/or breakthroughs, through blow-molding, which comprises placing a freshly extruded synthetic-material tube in a blow-molding die having flat, slightly or gently contoured surfaces; initially expanding the synthetic-material tube in the blow-molding die with pneumatic internal pressure and molding the synthetic-material tube onto the surfaces of the blow-molding die; and holding the synthetic-material tube onto the surfaces of the blow-molding die, for shaping strong, sharp-edged contours and undercuts with mechanical pressure exerted by the blow-molding die on an outer surface of the internally pneumatically acted upon and expanded synthetic-material tube.

Thus the freshly extruded synthetic-material tube is expanded in the blow-molding die into an internal space free of strongly pronounced projections, pre-molded and held, so that the existing danger of bonding between the internal surfaces, particularly of narrow synthetic-material tubes, is considerably reduced or even completely eliminated. The sharp-edged recesses or undercuts are then pressed-in during a second molding step through the use of a tool shaped according to the contours to be achieved, which is driven against the outer wall of the expanded synthetic-material tube held in the blow-molding die. High-quality molded parts are thus available with low defect rates.

In accordance with another mode of the invention, the mechanical molding of the contour takes place in several partial steps in order to be able to achieve a gradual, differentiated molding and different contour structures.

In accordance with a further mode of the invention, the inner surfaces of the tube for forming undercuts, which originate from break-throughs to be produced in this region, are more or less strongly pressed together. The actual undercut thereby arises after formation of a break-through in the region which is pressed together.

In accordance with an added mode of the invention, a variable wall thickness in the undercut region is set through selection of the mold pressure.

In accordance with an additional mode of the invention, the different wall thicknesses are produced in one and the same undercut region, or cavities are created or left between two inner wall surfaces, by pressing together in several molding steps.

In accordance with yet another mode of the invention, the entire molding process proceeds in combination with surface-coating of the molded part in such a way that a coating material laid in the blow-molding die is pressed onto the surface and into the sharp-edged contours of the molded part through the pneumatic internal pressure and the tool is driven against the outer surface of the synthetic-material tube. This enables error-free attachment of the coating web, i.e. without premature adhesion, displacement or distortion.

With the objects of the invention in view, there is also provided a device for fabricating synthetic-material molded parts through blow-molding, comprising a blow-molding die having two die halves and a wall defining an interior for receiving an extruded, preformed, synthetic-material tube to be expanded and held on the wall of the blow-molding die;

and a shaping slide encased by the wall of the blow-molding die, the shaping slide movable or slidable into the interior of the blow-molding die for mechanically influencing outer wall surfaces of the expanded, preformed synthetic-material tube held on the wall of the blow-molding die.

In accordance with another feature of the invention, the shaping slides are used for shaping the sharp-edged recesses or undercuts in the pre-molded, expanded synthetic-material tube, and a front surface of the shaping slide, i.e. the surface directed towards the inside of the blow-molding die, finishes flush with the inner surface of the blow-molding die before the molding and during removal from the mold.

In accordance with a further feature of the invention, the shaping slide is formed from a combined block of several slide parts which can be driven forward or retracted either synchronously or independently from each another. As a result the molding of the sharp-edged recesses or undercuts can be performed in several partial steps in order to achieve different shapes, layer thicknesses or cavities and a more careful, gentle molding procedure can be carried out.

In accordance with an added feature of the invention, the slide parts are slide lamellae disposed adjacently parallel to each other.

In accordance with an additional feature of the invention, additional slide elements disposed perpendicularly to the slide lamellae can be movably attached at their narrow longitudinal surfaces whereas leading slide elements can be disposed at outside broad surfaces of the slide lamellae.

In accordance with yet another feature of the invention, the slide lamellae and the slide segments, with or without cutting edges, individually serve the purpose of molding and removing the synthetic-material tube from the blow-molding die.

In accordance with yet a further feature of the invention, the shaping slide or the slide lamellae or the slide segments or the slide elements are individually steplessly driven mechanically, hydraulically or pneumatically.

In accordance with yet an added feature of the invention, the wall of the blow-molding die has vacuum drillings formed therein to be connected to a vacuum pump for additionally securing at least one of the synthetic-material tube and a coating material to be pressed to the synthetic-material tube, in position.

In accordance with yet an additional feature of the invention, the shaping slide is a diaphragm. In accordance with a concomitant feature of the invention, the diaphragm is formed of rubber or a different elastic material.

Other features which are considered as characteristic for the invention are set forth in the appended claims.

Although the invention is illustrated and described herein as embodied in a method and a device for fabricating synthetic-material molded parts through blow molding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
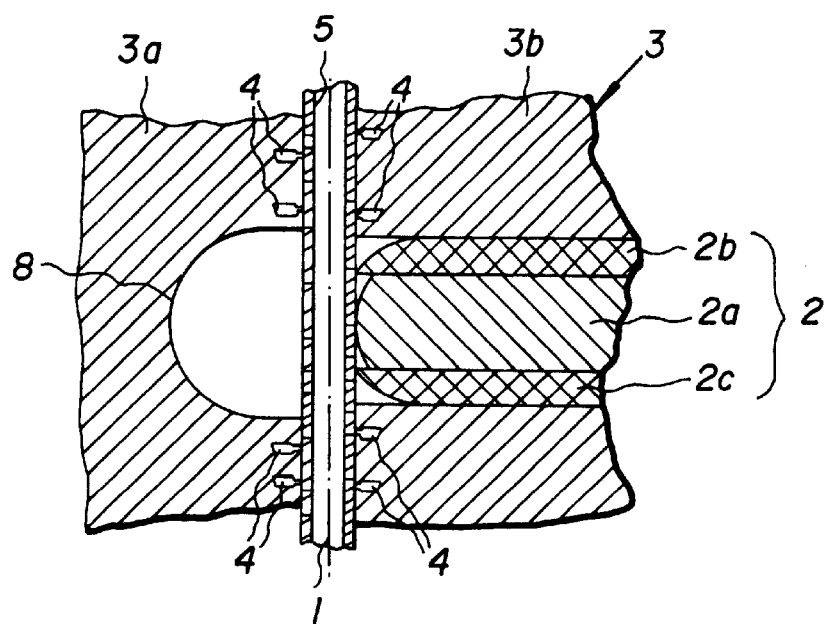
FIG. 1 is a fragmentary, diagrammatic, sectional view of a blow-molding die according to the invention with a multi-part shaping slide after expansion and during holding of a synthetic-material tube but before molding of an undercut region in connection with a break-through to be inserted subsequently.

Referring now to the figures of the drawings in detail and first, particularly, to FIG. 1 thereof, there is seen an illustration of a fabrication of a synthetic-material part to be formed with undercuts or sharp-edged recesses, for example a dashboard, through the use of extrusion blow-molding. The fabrication is carried out in such a way that after a freshly extruded synthetic-material tube 5 that is closed at its ends is brought between two halves 3a and 3b of a blow-molding die 3 and the two halves 3a, 3b of the die are closed, the synthetic-material tube 5 is expanded in a first process step by air over-pressure. The expansion of the synthetic-material tube 5 is carried out to the extent that its outer surface essentially lies against flat and gently or slightly contoured inner surfaces of the two halves 3a, 3b of the die, in other words with the exception of extremely pronounced recesses such as an internal contour 8 angled at 90° to a die separation line 1, and is also held in position by the air over-pressure.

After the shaping of the extruded synthetic-material tube through blow-molding using air over-pressure in the first process step illustrated in FIG. 1, a second process step takes place in which undercuts to be formed in the finished product are shaped mechanically through a movable shaping slide 2. The shaping slide 2 is guided in the die half 3b and is flush with and encased by an inner wall surface of the die half 3b seen in FIG. 1 during the blow-molding process. The fact that strongly contoured parts of the blow-molding die do not project into a space between the two halves 3a, 3b of the die during the blow-molding process avoids an undesired contact of inner wall surfaces of the tube. Such contact would have led to the finished product being of lower quality or unusable. The shaping slide may be a diaphragm formed of rubber or a different elastic material.

Figure 2:
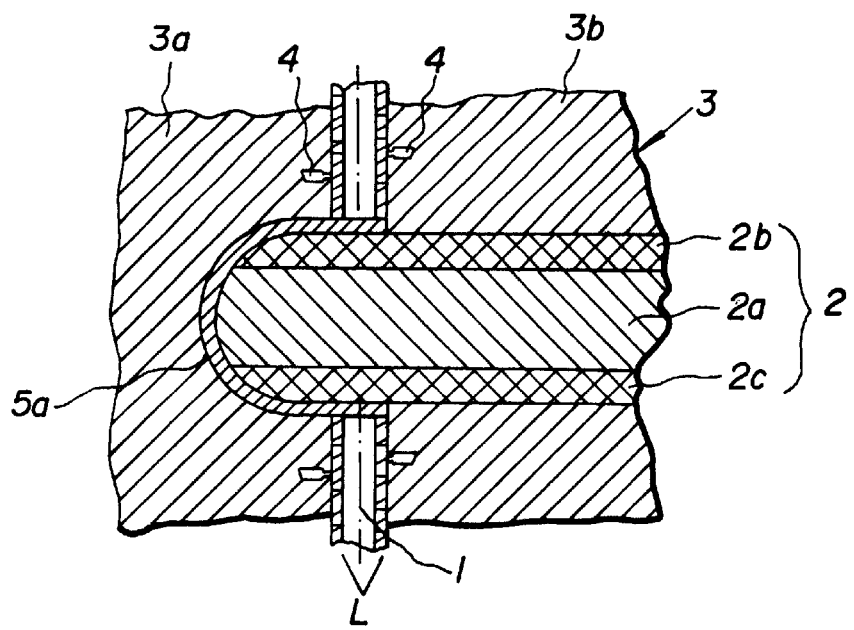
FIG. 2 is a fragmentary, sectional view of the blow-molding die according to FIG. 1, but after molding of the undercut region.

As can be seen in FIGS. 1 and 2, vacuum drillings 4 connected to a vacuum pump 4' are also provided in both halves 3a, 3b of the die. The vacuum drillings 4 additionally hold the synthetic-material tube 5 through slight under-pressure to the inner wall surfaces of the blow-molding die 3. Thus the vacuum drillings 4 provide further protection against premature contact of the inner wall surfaces and thus the unintended bonding of the same, or against a displacement of a non-illustrated coating web inserted in the die.

The shaped synthetic-material tube 5 in FIG. 2 is a molded part in which the inner wall surfaces of the tube are pressed together and bonded in the region of the shaping slide 2 and at the same time a desired recess 5a is shaped in the internal contour 8 in the die half 3a through the use of the shaping slide 2. The shape of the shaping slide 2 corresponds to the recess 5a. Insofar as the recess 5a is broken through, it can just as well form an undercut region.

In the embodiment illustrated in FIG. 2 it is also possible to set a final position of the shaping slide 2 in such a way that it is possible to vary a compression between the two sides of the tube and therewith the thickness of the layer in the region of the undercut.

In the case of a larger separation between the inner wall surfaces of the tube than that of the embodiment chosen for FIGS. 1 and 2, it is equally conceivable for a larger recess (sharp-edged angled indentation) to be shaped only on one side of the tube without the inner wall surfaces of the tube making contact with each other.

After the shaping process, the shaping slide 2 is retracted again into the position flush with the inner wall surface of the die half 3b so that the finished molded part can be removed from the blow-molding die 3 without difficulty.

According to the drawing, the shaping slide 2 is formed from three slide lamellae 2a to 2c which are disposed parallel and adjacent each other and which can also be moved independently of each other. As is shown in FIGS. 1 and 2, it is thereby possible to bring the shaping slide into a position flush with the internal contour of the relevant die half 3b by retracting a part of the shaping slide projecting at a front surface, in this case the middle slide lamella 2a. According to FIG. 1, shaping of the recess 5a is performed by first driving out the middle slide lamella 2a and then afterwards driving the slide 2 as a whole out of the wall of the die half 3a.

Figure 3:
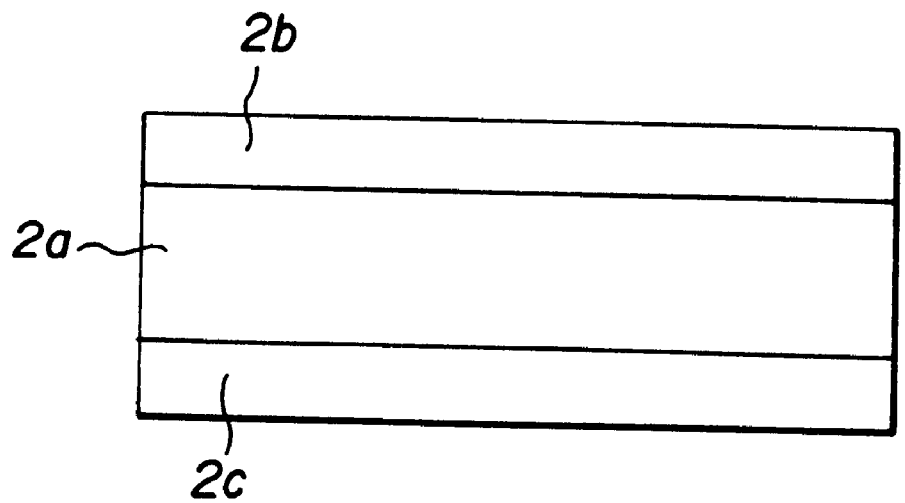
FIG. 3 is a front-elevational view of a shaping slide formed of three slide lamellae.
Figure 4:
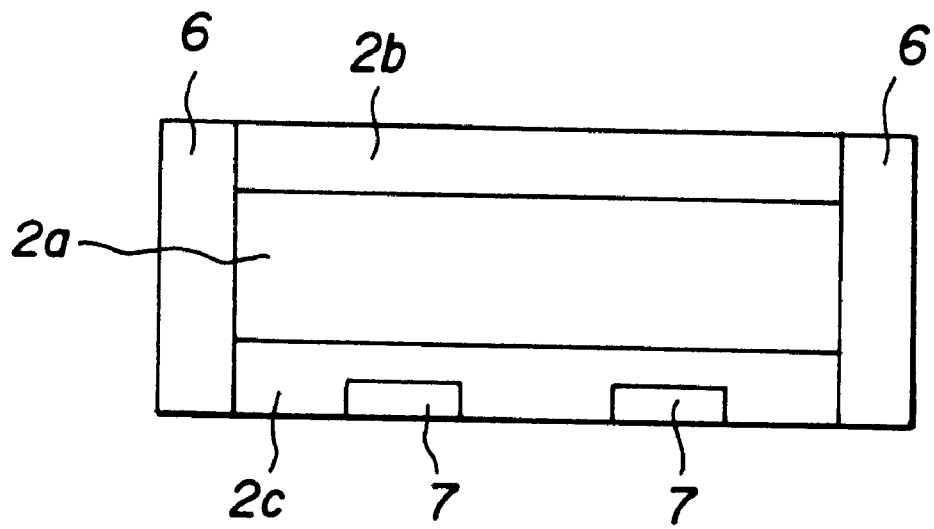
FIG. 4 is a front-elevational view of a further embodiment of a multi-part shaping slide with slide segments disposed vertically at narrow sides of the slide lamellae.

FIG. 3 shows a front view of the shaping slide 2 with the middle slide lamella 2a together with a lower slide lamella 2c and an upper slide lamella 2b. FIG. 4 illustrates a shaping slide with further longitudinally slidable leading or advance slide elements 7, with which the synthetic-material tube to be shaped can be shaped in advance in a mechanical shaping step. In this way, it is possible to achieve wall thicknesses that are different from those of other regions or to achieve special shapes. Further slidably guided slide segments 6 are provided laterally and perpendicular to the slide lamellae 2a to 2c so that molded parts with specific cavity structures can be fabricated by different final positions of the slide segments 6 and the slide lamellae 2a to 2c.

The diverse slide parts, namely the slide lamellae, slide segments and slide elements, can be moved independently from each other or synchronously with each other. They serve both for shaping the synthetic-material molded parts and for removing them from the mold and can be constructed with or without cutting edges.

I claim:

1. A method for fabricating synthetic-material molded parts through blow-molding, which comprises:

placing a freshly extruded synthetic-material tube in a blow-molding die having flat or gently contoured surfaces;

initially expanding the synthetic-material tube in the blow-molding die with pneumatic internal pressure and molding the synthetic-material tube onto the surfaces of the blow-molding die;

providing shaping slides including several selectively independently and synchronously movable slide parts, the slide parts including two slidable slide lamellae disposed adjacently and parallel to each other, the slide lamellae having narrow longitudinal sides and being slidable in a given direction, and slide segments being disposed at the narrow longitudinal sides of the slide lamellae being perpendicular to the slide lamellae and being slidable in the given direction;

providing the slide lamellae with an outer lying broad longitudinal side and leading slide elements being disposed at the outer lying broad longitudinal side, the slide lamellae and the slide segments having cutting edges and individually molding and removing the synthetic-material tube from the blow-molding die;

providing the slide lamellae and the slide segments for individually molding and removing the synthetic-material tube from the blow-molding die;

holding the synthetic-material tube onto the surfaces of the blow-molding die, for shaping strong, sharp-edged contours and undercuts with mechanical pressure exerted by the shaping slides of the blow-molding die on an outer surface of the internally pneumatically acted upon and expanded synthetic-material tube;

performing the mechanical shaping step in several partial steps;

pressing walls of the synthetic-material tube together with different contact pressures during the partial steps for creating variable wall thicknesses and creating cavities of different sizes;

pressing together and bonding internal wall surfaces of the synthetic-material tube to each other to form the undercuts at cutouts;

molding a coating material disposed in the blow-molding die into sharp-edged recesses in the outer surface of the molded synthetic-material tube, simultaneously with the pneumatic and mechanical shaping step; and providing the wall of the blow-molding die with vacuum drillings formed therein being connected to a vacuum pump for additionally securing in position at least one of the synthetic-material tube and a coating material being pressed to the synthetic-material tube.

2. The method according to claim 1, which comprises forming the synthetic-material tube into supporting or covering motor vehicle parts, the supporting or covering motor vehicle parts containing at least one of recesses and break-throughs.

3. The method according to claim 1, which comprises shaping break-throughs for lines, rods and other elements to be led through in a pressed together region, and then forming an undercut region with a remaining pressed together part.

4. The method according to claim 3, which comprises pressing walls of the synthetic-material tube together in one surface region in several partial molding steps with different contact pressures, for varying a material thickness and creating cavities in the one surface region.

5. The method according to claim 1, which comprises pressing a coating material disposed in the blow-molding die onto the outer surface of the molded synthetic-material tube and molding the coating material into sharp-edged recesses in the outer surface of the molded synthetic-material tube, simultaneously with the pneumatic and mechanical shaping step.

6. The method according to claim 1, which comprises pressing a coating material disposed in the blow-molding die onto the outer surface of the molded synthetic-material tube, simultaneously with the pneumatic and mechanical shaping step.

* * * * *